(12) United States Patent
Takahashi et al.

(10) Patent No.: US 8,784,263 B2
(45) Date of Patent: Jul. 22, 2014

(54) VEHICLE DRIVE APPARATUS WITH MOMENTARY SWITCH-ACTIVATED EXHAUST BRAKE

(75) Inventors: Tomoya Takahashi, Ann Arbor, MI (US); Kazuhiro Irie, Farmington Hills, MI (US); Kazushi Konno, Chita (JP)

(73) Assignees: Aisin Seiki Kabushiki Kaisha, Kariya-Shi, Aichi-Ken (JP); Aisin Technical Center of America, Inc., Plymouth, MI (US)

( * ) Notice: Subject to any disclaimer, the term of this patent is extended or adjusted under 35 U.S.C. 154(b) by 267 days.

(21) Appl. No.: 13/302,003

(22) Filed: Nov. 22, 2011

(65) Prior Publication Data

US 2013/0053213 A1 Feb. 28, 2013

Related U.S. Application Data

(60) Provisional application No. 61/529,672, filed on Aug. 31, 2011.

(51) Int. Cl.
*B60W 10/198* (2012.01)
*B60W 10/02* (2006.01)

(52) U.S. Cl.
USPC ............................................. 477/5; 477/174

(58) Field of Classification Search
USPC ........ 477/3, 5, 174, 180; 180/65.28; 123/320, 123/323
See application file for complete search history.

(56) References Cited

U.S. PATENT DOCUMENTS 5,903,112 A * 5/1999 Yamada et al. ................. 318/10
7,131,708 B2 * 11/2006 Tao et al. ....................... 303/152
7,477,031 B2 * 1/2009 Ogata et al. .................... 318/430
8,602,142 B2 * 12/2013 Books et al. ................ 180/65.21
2008/0070745 A1 * 3/2008 Ogata ............................. 477/15
2009/0298641 A1 * 12/2009 Boot et al. ........................ 477/4
2011/0288703 A1 * 11/2011 Falkenstein et al. ............ 701/22
2013/0029805 A1 * 1/2013 Matsuo et al. .................... 477/5
2013/0133965 A1 * 5/2013 Books ........................... 180/165
2013/0197735 A1 * 8/2013 Ueno .............................. 701/22

FOREIGN PATENT DOCUMENTS

JP 09088619 A * 3/1997
JP 2003-276585 A 10/2003
JP 2003284204 A * 10/2003

OTHER PUBLICATIONS

English translation of JP2003284204A, http://translationportal.epo.org, Dec. 19, 2013.*

* cited by examiner

*Primary Examiner* — Roger Pang
(74) *Attorney, Agent, or Firm* — Buchanan Ingersoll & Rooney PC

(57) ABSTRACT

A hybrid driving apparatus includes a diesel engine outfitted with an exhaust brake, and a clutch between the diesel engine and a hybrid motor. The exhaust brake is shiftable between an operational state and a non-operational state, and a switch is operable to change the exhaust brake from the non-operational state to the operational state. The switch is configured to automatically change the exhaust brake which is in the operational state while the vehicle is turned on to the non-operational state when the vehicle is turned off. The clutch is automatically changed from an engaged condition, in which the diesel engine and the hybrid motor are connected, to the disengaged condition, in which the diesel engine and the hybrid motor are disconnected, when the vehicle decelerates while the exhaust brake is in the non-operational state.

8 Claims, 8 Drawing Sheets

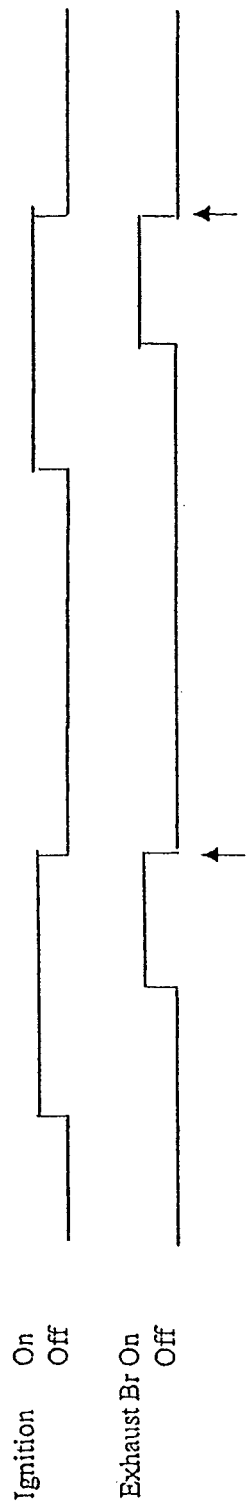
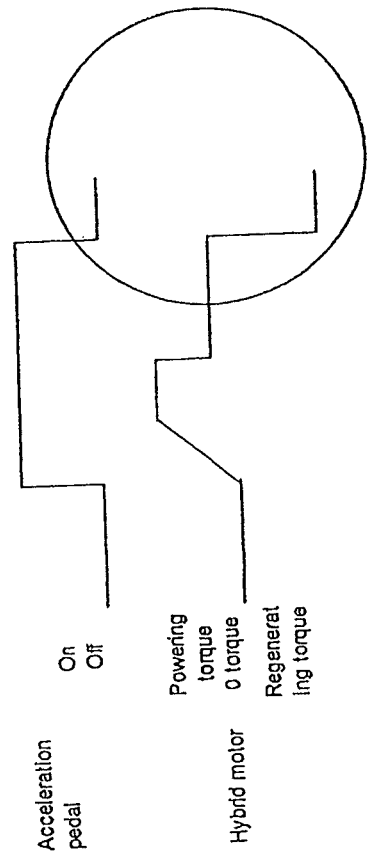
Fig. 4
Fig. 5

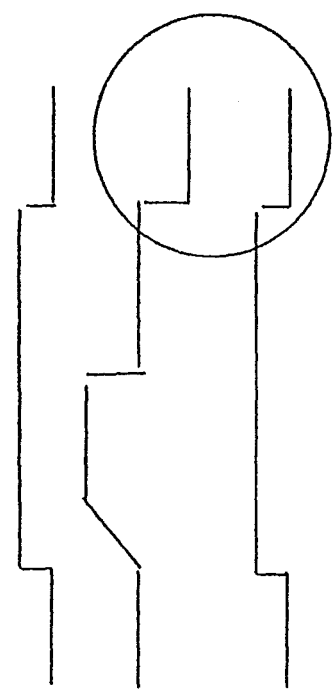
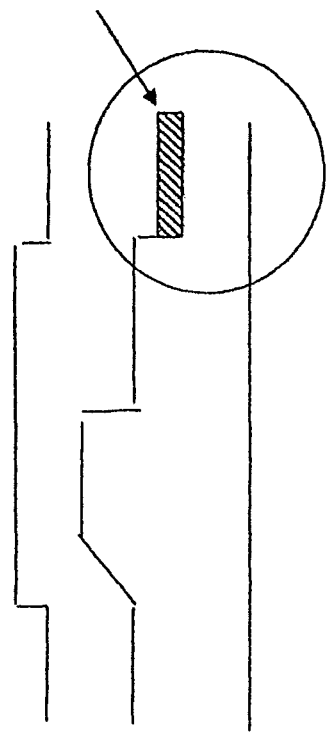

US 8,784,263 B2

VEHICLE DRIVE APPARATUS WITH MOMENTARY SWITCH-ACTIVATED EXHAUST BRAKE

TECHNOLOGICAL FIELD

The disclosure here pertains to a vehicle drive apparatus utilizing exhaust brake, including a hybrid drive apparatus for a vehicle.

BACKGROUND DISCUSSION

Diesel vehicles are sometimes equipped with an exhaust brake. Generally speaking, the exhaust brake is a mechanism that slows a diesel engine by closing off the exhaust path from the engines. This causes the exhaust gases to be compressed in the exhaust manifold and the cylinder. An exhaust brake is typically in the form of a valve (butterfly valve) in the exhaust system that is capable of being closed to restrict the exhaust flow. When the exhaust brake is operational (i.e., when the exhaust brake is on or is in an operational state), the valve forming the exhaust brake closes when the driver releases the accelerator pedal (i.e., wishes to decelerate the vehicle). With the valve in the closed condition, the exhaust flow from the cylinders is restricted and so pressure builds up in the exhaust system upstream from the exhaust brake. This creates a pressure on the top of the piston to resist upward movement of the piston, thus supplying a braking torque that slows the engine and the vehicle without the need for operating the vehicle's service brake. When the exhaust brake is operational (i.e., when the exhaust brake is on or is in an operational state), the valve forming the exhaust brake opens when the accelerator pedal is depressed so that the exhaust brake does not slow the vehicle engine/vehicle.

As illustrated in FIG. 1, the exhaust brake is operated by a toggle-type switch (exhaust brake switch) connected to an engine control unit (ECU) 12. The engine 14 in turn is connected to the ECU 12. This known toggle-type exhaust brake switch is operable by the user (driver) to turn the exhaust brake on so that the exhaust brake is in an operational state and to turn the exhaust brake off so that the exhaust brake is in a non-operational state. When the driver turns the toggle-type exhaust brake switch on, the toggle-type switch remains on until the driver once again operates the toggle-type exhaust brake switch. If the driver operates the exhaust brake switch during operation of the vehicle to turn the exhaust brake to the operational state, and then turns the vehicle off (i.e., the ignition is turned off) without operating the toggle-type exhaust brake switch to turn the exhaust brake to the non-operational state, the exhaust brake will still be in the operational state when the vehicle is next turned on (started). This is illustrated schematically in FIG. 2.

SUMMARY

One aspect of the disclosure here involves a hybrid driving apparatus comprising a transmission that includes a rotatable output shaft connected to wheels of a vehicle, a diesel engine connected to the transmission, wherein the diesel engine includes an exhaust brake shiftable between an operational state in which the exhaust brake produces a braking effect on the vehicle during deceleration of the vehicle and a non-operational state in which the exhaust brake does not produce the braking effect during deceleration of the vehicle; and a hybrid motor connected to the transmission and operable as both a motor and a generator. An accelerator sensor is connected to an accelerator to output accelerator signals indicating whether or not the accelerator is being operated to accelerate the vehicle, and a clutch is located between the diesel engine and the hybrid motor. The clutch is operable to shift between a connected condition in which the clutch connects the diesel engine to the hybrid motor and a disconnected condition in which the clutch does not connect the diesel engine to the hybrid motor. A clutch control unit is operatively connected to the clutch to shift the clutch between the connected condition and the disconnected condition, and a momentary switch is operatively connected to the exhaust brake so that operation of the momentary switch causes the exhaust brake in the non-operational state to shift to the operational state. The clutch control unit shifts the clutch from the connected condition to the disconnected condition during driving of the vehicle when the exhaust brake is in the off state and the accelerator shifts from being operated to not being operated.

The hybrid motor is an electrical motor controlled by an inverter, and a hybrid battery is connected to the inverter and is charged by the hybrid motor. A clutch control unit can be connected to the clutch and to the controller so that the clutch control unit receives signals from the controller indicating whether the exhaust brake is in the off state. The hybrid driving apparatus can also include a sensor which provides input to the clutch control unit indicating whether the vehicle is decelerating, with the clutch control unit operating the clutch to disengage the engine and the motor when the clutch control unit receives signals indicating that the exhaust brake is in the off state and the vehicle is decelerating.

According to another aspect, a hybrid driving apparatus comprises: a transmission that includes a rotatable output shaft connected to wheels of a vehicle; a hybrid motor connected to the transmission and operable as both a motor and a generator; a diesel engine; and a clutch between the diesel engine and the hybrid motor. The clutch is operable to change between: i) an engaged condition in which the clutch connects the diesel engine and the hybrid motor so that power produced by the diesel engine is transmitted to the transmission; and ii) disengaged condition in which the clutch disconnects the diesel engine from the hybrid motor so that the hybrid motor can be regenerated during vehicle deceleration while being free of engine friction of the diesel engine. The diesel engine includes an exhaust brake shiftable between an operational state in which the exhaust brake produces a braking effect on the vehicle during deceleration of the vehicle and a non-operational state in which the exhaust brake does not produce the braking effect on the vehicle during deceleration of the vehicle. A switch is operable to change the exhaust brake from the non-operational state to the operational state, wherein the switch is configured to automatically change from the operational state to the non-operational state when the vehicle is turned off. A clutch control unit is operatively connected to the clutch to change the clutch between the engaged state and the disengaged state, and the clutch control unit is configured to automatically change the clutch from the engaged condition to the disengaged condition when the vehicle decelerates while the exhaust brake is in the non-operational state and while the diesel engine or hybrid motor is operating.

In accordance with another aspect, a hybrid driving apparatus comprises: a transmission that includes a rotatable output shaft connected to wheels of a vehicle; a diesel engine connected to the transmission to rotate the output shaft and drive the wheels of the vehicle, wherein the diesel engine including an exhaust brake shiftable between: i) an operational state in which the exhaust brake produces a braking effect on the vehicle during deceleration of the vehicle but does not produce a braking effect on the vehicle during acceleration of the vehicle; and ii) a non-operational state in which the exhaust brake does not produce a braking effect on the vehicle during deceleration and acceleration of the vehicle; a hybrid motor connected to the transmission and operable as both a motor and a generator; a switch operatively connected to the exhaust brake to switch the exhaust brake in the operational state to the non-operational state by operating the switch and to switch the exhaust brake in the non-operational state to the operational state by operating the switch; and a control unit which receives information about the vehicle and/or driving conditions of the vehicle and which is operatively connected to the exhaust brake, the control unit switching the exhaust brake from the operational state to the non-operational state, while the vehicle is operating and without operation of the switch, based on the information received about the vehicle and/or driving conditions of the vehicle.

BRIEF DESCRIPTION OF DRAWING FIGURES

Additional features and details of the driving apparatus disclosed here will become more apparent from the detailed description set forth below, considered with reference to the accompanying drawing figures.

FIG. 4 is a timing chart illustrating the relationship between the state of the ignition and the state of the exhaust brake for the vehicle driving apparatus shown in FIG. 3.

FIG. 5 is a timing chart illustrating the relationship between the state of the acceleration pedal and the state of the hybrid motor for the vehicle driving apparatus shown in FIG. 3. when the exhaust brake is in the non-operational state.

Figure 1:
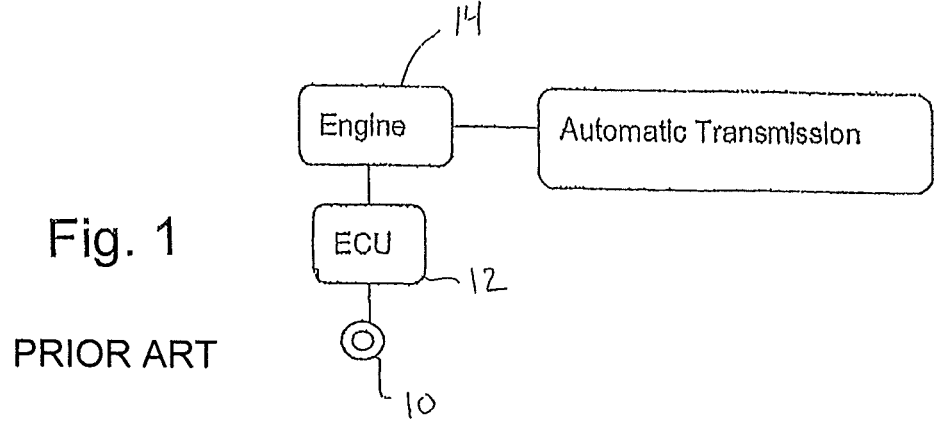
FIG. 1 is a schematic illustration of a known vehicle driving apparatus outfitted with a toggle-type exhaust brake switch.
Figure 2:
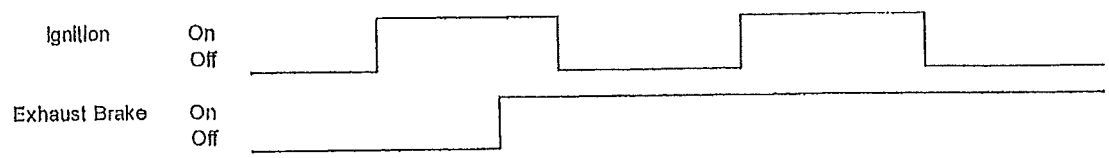
FIG. 2 is a timing chart showing the relationship between the vehicle ignition state and the state of the brake switch for the vehicle driving apparatus shown in FIG. 1.
Figure 3:
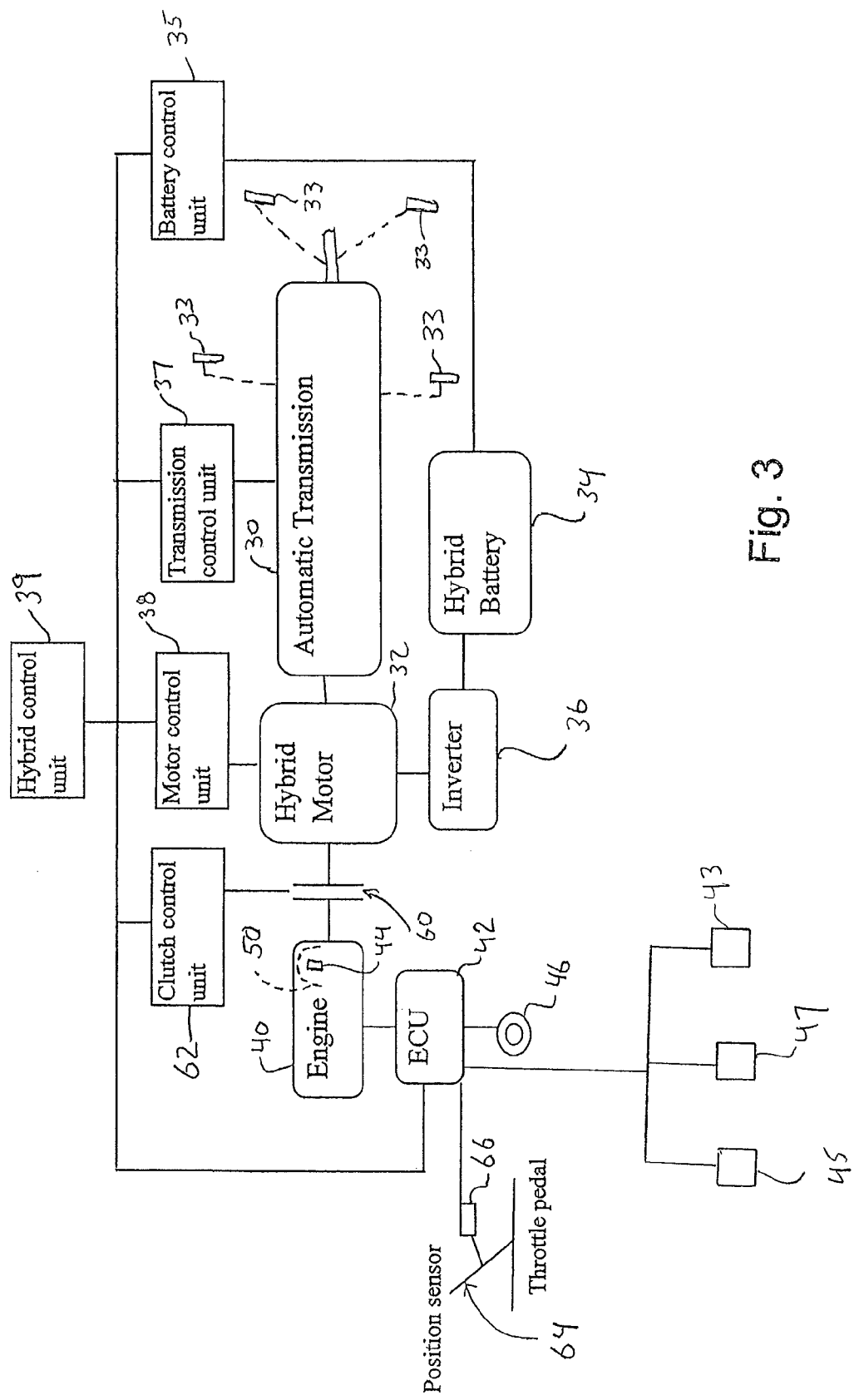
FIG. 3 is a schematic illustration of the vehicle driving apparatus (hybrid driving apparatus) disclosed here.

FIGS. 6A and 6B are timing charts illustrating the relationship between the state of the acceleration pedal, the state of the hybrid motor for the vehicle driving apparatus shown in FIG. 3 and the state of the clutch, with FIG. 6A illustrating the relationship when the exhaust brake is in the non-operational state and FIG. 6B illustrating the relationship when the exhaust brake is in the operational state.

Figure 7:
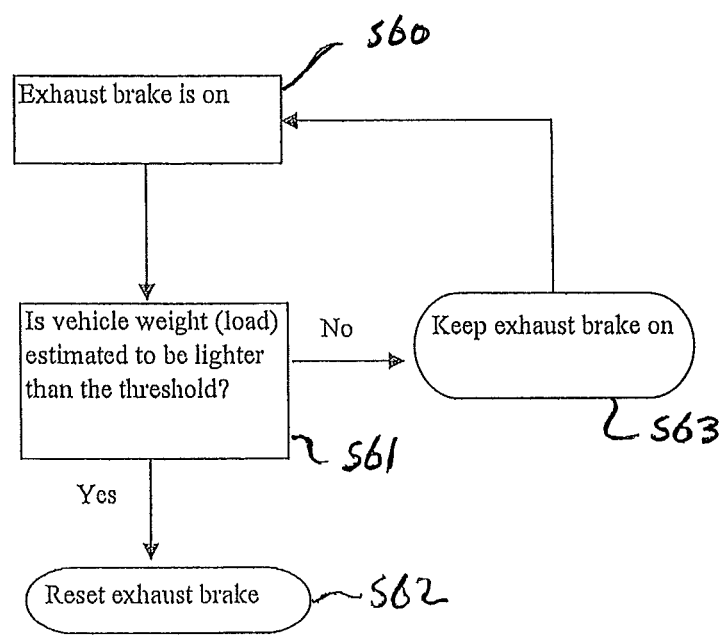

FIG. 7 is a program routine illustrating one alternative for automatically resetting the exhaust brake, for example to the non-operational state.

Figure 8:
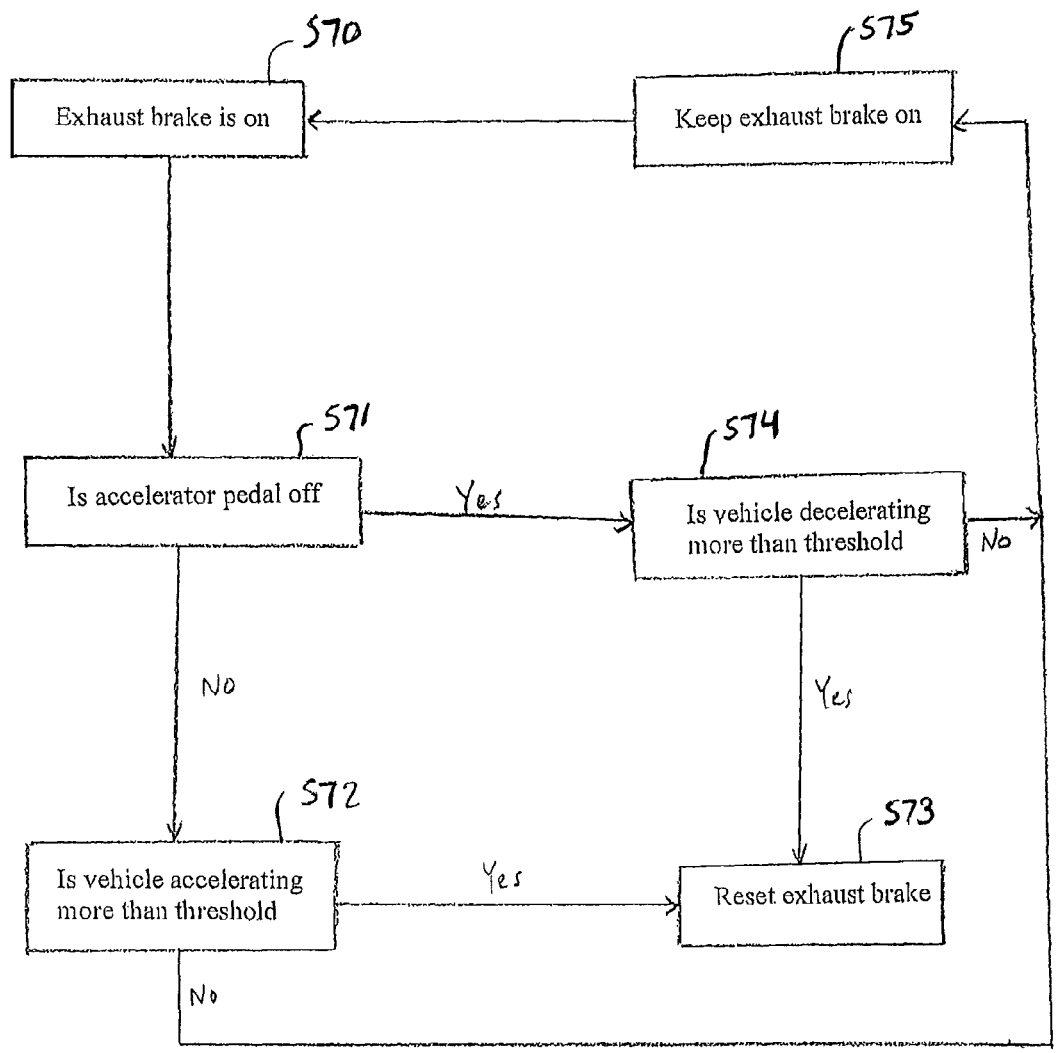

FIG. 8 is a program routine illustrating another alternative for automatically resetting the exhaust brake, for example to the non-operational state.

Figure 9:
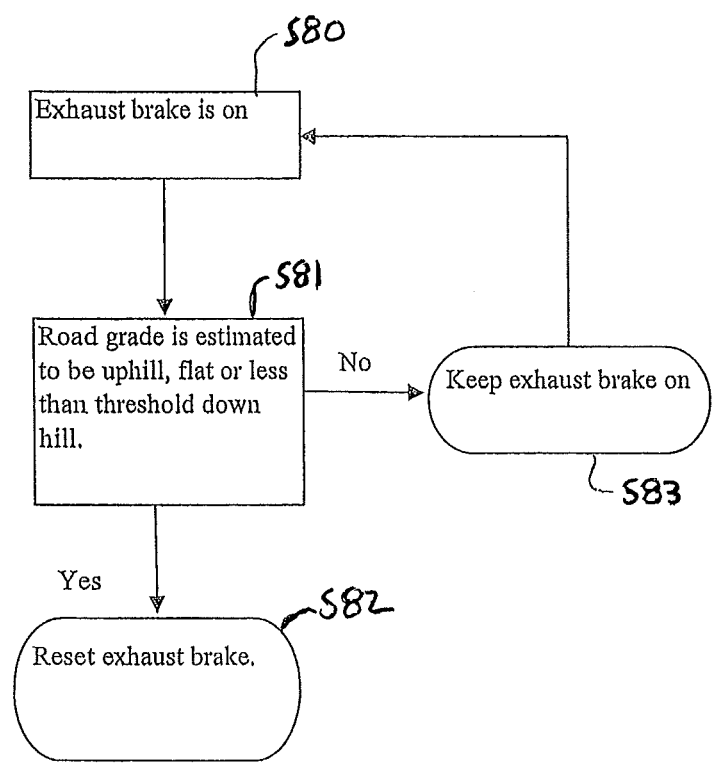

FIG. 9 is a program routine illustrating an additional alternative for automatically resetting the exhaust brake, for example to the non-operational state.

Figure 10:
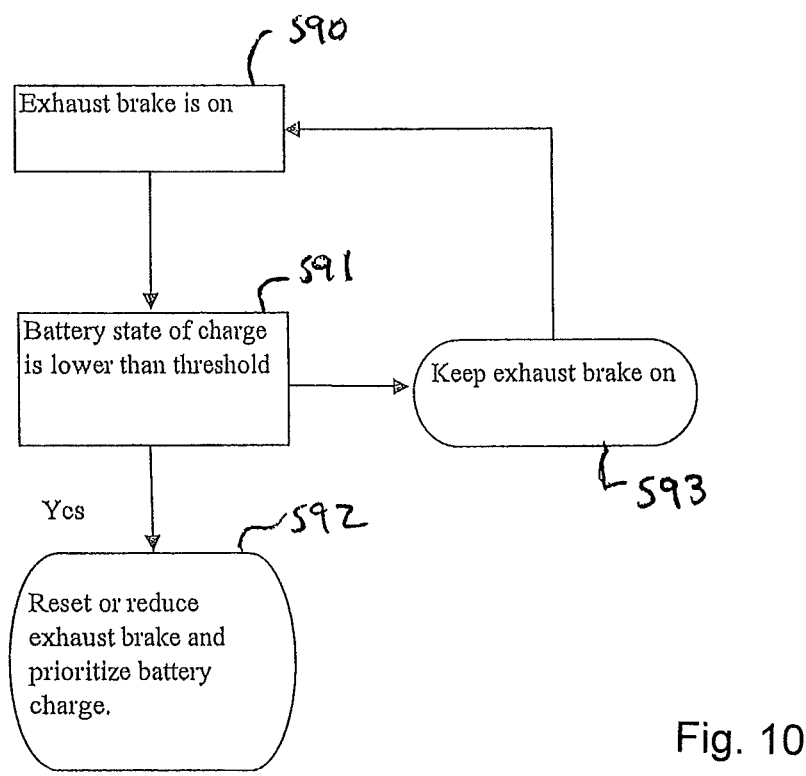

FIG. 10 is a program routine illustrating a further alternative for automatically resetting the exhaust brake, for example to the non-operational state.

DETAILED DESCRIPTION

FIG. 3 schematically illustrates a hybrid driving apparatus for a vehicle, more specifically a diesel-electric engine hybrid drive apparatus. As described in more detail below, the hybrid driving apparatus is outfitted with an exhaust brake.

As generally illustrated in FIG. 3, the hybrid driving apparatus includes a transmission mechanism 30 connected to a motor 32, with the motor 32 connected to a battery 34 by way of an inverter 36. The motor 32 is a hybrid motor which operates as both an electric motor and a generator, and the battery 34 is a hybrid battery which can be recharged. In the illustrated embodiment disclosed by way of example, the transmission mechanism 30 is an automatic transmission 30. The motor 32 is also connected to a diesel engine 40 serving as a power source. The engine 40 is connected to and controlled by an engine control unit 42, the motor 32 is connected to and controlled by a motor control unit 38, the battery 34 is connected to and controlled by a battery control unit 35, and the transmission 30 is connected to and controlled by a transmission control unit 37. As illustrated in FIG. 3, the engine control unit 42, the motor control unit 38, the battery control unit 35, the transmission control unit 37 and a hybrid control unit 39 are connected to each other and communicate with each another.

The features of the diesel-electric engine hybrid drive apparatus described in the preceding paragraph, the way in which the features operate and interact with one another, and operational aspects of diesel-electric engine hybrid drive apparatuses are known and are thus not described in detail here. Examples of diesel-electric engine hybrid drive apparatus and vehicles using such apparatus include the Mitsubishi Canter Hybrid vehicle, and the Eaton hybrid system used in Freightliner vehicles.

The motor 32 and the engine 40 serve as driving sources, and the transmission includes a known gear mechanism (planetary gear mechanism) driven by torque generated by the diesel engine 40 and/or the motor 32 in a known manner so that at least a part of the power from the motor 32 or the engine 40 is distributed to a rotation output shaft 31 of the transmission and ultimately to at least some of the wheels 33 of the vehicle connected to the output shaft 31. The hybrid driving apparatus can be a parallel hybrid system, a series hybrid system or a power-split hybrid system.

The hybrid drive apparatus disclosed here also includes an exhaust brake 44 which is schematically illustrated in the schematically depicted exhaust 50 of the diesel engine 40. The exhaust brake 44 can be of a known construction involving a valve situated in the exhaust and operable to a closed position to restrict or cut-off the exhaust flow. When the exhaust brake 44 is turned on or is in the operational state, the valve closes to cut-off exhaust flow when the driver releases the accelerator pedal and opens to permit exhaust flow when the driver steps on or presses the accelerator pedal to accelerate. When the exhaust brake 44 is turned off or is in the non-operational state, the valve forming the exhaust brake 44 remains open always so that the position of the exhaust valve does not change during pressing/release of the accelerator.

The engine control unit 42 is connected to a switch 46 for switching the exhaust brake 44 between the operational state and the non-operational state. This switch is a momentary switch 46. The exhaust brake 44 is turned on by operating the momentary switch 46. The momentary switch is a bias type of switch which allows current to be applied for a limited time duration, namely only while the switch 46 is pressed or operated. In this regard, the momentary switch 46 acts as a signal producer that produces a signal when operated or pushed indicating that the exhaust brake 44 should be turned to the operational state or the non-operational state.

The momentary switch 46 is preferably positioned inside the vehicle interior where it is relatively easily accessible by the driver. To change the exhaust brake 44 from the non-operational state to the operational state, the driver operates the momentary switch 46. The operation of the momentary switch 46 causes a signal to be sent to the engine control unit 42 which then causes the exhaust brake 44 to be in the operational state. The driver can turn off the exhaust brake 44 (turn the exhaust brake to the non-operational state) by once again operating the momentary switch 46 which causes another signal to be sent to the engine control unit 42 to change the exhaust brake 44 to the non-operational state.

Configuring the system to include the momentary switch 46 for operating then exhaust brake is quite beneficial. If the momentary switch 46 is operated to turn the exhaust brake 44 to the operational state and the vehicle is subsequently turned off without the momentary switch 46 having been once again operated to turn the exhaust brake to the non-operational state, the exhaust brake 44 is automatically reset to the non-operational state whenever the ignition switch is operated. That is, if the momentary switch 46 is operated so that the exhaust brake 44 is in the operational state, and the vehicle engine or ignition switch is subsequently turned off without the momentary switch 46 having been once again operated to turn the exhaust brake to the non-operational state, the exhaust brake 44 is automatically turned off or reset to the non-operational state. This is illustrated in FIG. 4. As shown in FIG. 4, when the exhaust brake 44 is turned on or switched to the operational state through operation of the momentary switch 46 while the vehicle is operating (ignition switch on), the exhaust brake operates. While the exhaust brake is in the operational state, the engine brake decreases the engine/vehicle speed when the accelerator pedal is released. When the vehicle is turned off (ignition switch off), the exhaust brake is automatically reset to off or switched to the non-operational state as identified by the arrows in FIG. 4. Then, when the vehicle is next turned on (ignition switch on), the exhaust brake is in the non-operational state. This is quite beneficial as it contributes to improved fuel economy.

If the exhaust brake remained in the operational state when the vehicle is turned off (ignition switch off), the exhaust brake would become immediately operational (i.e., the exhaust brake will be in the operational state) the next time the vehicle is turned on. But in that situation, there is a strong likelihood that the exhaust brake is not needed or desired, and so the result will be a needless reduction in the fuel economy. This is an undesirable result, particularly in the case of a hybrid vehicle which is specifically adapted to achieve improved fuel economy. Thus, the use of the momentary switch 46 avoids difficulties created when the driver forgets to turn off the exhaust brake before turning off the vehicle.

The vehicle hybrid driving apparatus disclosed here utilizes energy regeneration to slow the vehicle by converting the kinetic energy of the moving vehicle into energy which is stored. The motor 32 is used as a generator during deceleration/braking to recoup some of the energy otherwise lost during deceleration/braking, and this energy is stored in the battery 32 for later use to accelerate the vehicle.

To effectively use this energy regeneration in combination with the exhaust brake and momentary switch 46 described above, the vehicle hybrid driving apparatus disclosed here also includes a clutch 60 positioned between and operatively coupled to the engine (diesel engine) and the motor 32. The transmission 30 is thus connected to the end of the hybrid motor 32 opposite the end to which the clutch 60 is connected.

The exhaust brake 44 in the non-operational state is an indication that the driver does not want or need exhaust braking to help slow the vehicle. This may be because the vehicle is not carrying a heavy load, is traveling on a relatively flat road, is not traveling on a steep incline, or another reason. In such situations, it is desirable when the vehicle is decelerating to be able to maximize the motor regeneration by decoupling or disconnecting the motor 32 from the engine to free the driveline from the engine friction. The clutch 60 makes this possible. When the exhaust brake 44 is in the non-operational state and the vehicle is decelerating (i.e., the acceleration pedal is not being operated), the clutch 60 is in the disengaged or disconnected condition, and the motor 32 is disengaged or disconnected from the engine 40 so that the driveline is freed from engine friction. This thus maximizes the motor regeneration opportunity. On the other hand, when the exhaust brake is in the non-operational state and the vehicle is accelerating (the accelerator pedal is being pressed), the clutch 60 is in the engaged or connected condition so that the clutch 60 engages or connect the engine 40 and the motor 32. Similarly, whenever the exhaust brake 44 is in the operational state, the clutch is in the engaged or connected condition so that the engine 40 and the motor 32 are engaged by the clutch 60. Changing the clutch 60 between the engaged condition (connected condition) and the disengaged condition (disconnected condition), and vice versa, can be accomplished and controlled by a clutch control unit 62. It is also possible to control the clutch 60, including its change between the engaged and disengaged conditions (connected and disconnected conditions), by way of the engine control unit, hybrid motor control unit, or the transmission control unit.

One way of achieving the controlled operation of the clutch 60 described above involves providing a sensor 66 which senses operation of the accelerator 64 (acceleration pedal) as shown in FIG. 3. Signals from the sensor 66 provide accelerator pedal position information which can be sent to the hybrid control unit 39. The hybrid control unit 39 can also receive signals (e.g., from the engine control unit 42) about the operational state of the exhaust brake 44 (i.e., that the exhaust brake 44 is either in the operational state or the non-operational state). When the hybrid control unit 39 determines that the clutch 60 should be engaged or disengaged based on the received signals/information, the hybrid control unit can query the transmission control unit 37 to determine if the clutch 60 can be engaged or disengaged. After receiving a response indicating that the clutch can be engaged or disengaged, the clutch 60 can be appropriately controlled, as described above, to either engage or disengage the motor 32. This control can be carried out by the clutch control unit 62 after receiving input from the hybrid control unit.

FIG. 5 illustrates the relationship between the acceleration pedal 66 operation and the motor 32 consistent with the description above. The circled portion of FIG. 5 illustrates the effect of the clutch 60 operation described above. If the exhaust brake 44 is in the non-operational state, the clutch 60 is turned off (disengaged condition) when the acceleration pedal is off (i.e., during deceleration) so that the regeneration amount is increased or maximized because the driveline is free of the engine friction and because there is not energy loss attributable to the exhaust brake. FIGS. 6A and 6B illustrate the relationship between the state of the acceleration pedal (on/pressed or off/released), the state of the hybrid motor for the vehicle driving apparatus shown in FIG. 3 and the state of the clutch (on/engaged or off/disengaged), wherein FIG. 6A shows the relationship when the exhaust brake is off (non-operational state) and FIG. 6B shows the relationship when the exhaust brake is on (operational state). Comparing the circled portions in FIGS. 6A and 6B, the shaded region in FIG. 6B identified by the arrow is an indication of the additional regeneration that is achieved by operating the clutch 60, while the exhaust brake 44 is in the non-operational state and during deceleration, to disengage the motor 32 from the engine 40 so that the driveline is freed from engine friction.

As explained above, the momentary switch 46 helps improve fuel economy by preventing the exhaust brake 44 from being maintained in the operational state (on) after the vehicle has been turned off. Improvements in fuel economy associated with proper operation and control of the exhaust brake can also be realized in other ways.

For example, a transportation vehicle that transports relatively heavy loads would benefit from the use of the exhaust brake, at least in some conditions. But after the vehicle has delivered the load (e.g., the load has been emptied from the vehicle or the trailer has been unhitched), the vehicle might no longer have a need to operate the exhaust brake. In that situation, it would be desirable to automatically turn off the exhaust brake or reset the exhaust brake to off so that the exhaust brake is in the non-operational state. This can be accomplished by using an appropriate sensor or plural sensors (schematically identified as 43 in FIG. 3) providing signals or feedback about the weight of the vehicle, with the output from such sensors being sent to the engine control unit 42. In that way, when it is determined that the vehicle weight is below a weight threshold, the engine control unit 42 automatically turns off the exhaust brake or resets the exhaust brake to off so that the exhaust brake is in the non-operational state. This thus helps improve fuel economy by cancelling the exhaust brake 44 during light vehicle weight conditions.

An example of a control routine performed by a control unit (e.g., the hybrid control unit) according to this alternative is illustrated in FIG. 7. In step S60, the controller determines that the exhaust brake is in the operational state (i.e., the exhaust brake is on) and moves to step S61 where the control unit estimates, for example based on input from the sensor(s) 43, whether the vehicle weight (estimated vehicle weight) is lighter or less than a predetermined threshold weight. If yes, the control moves to step S62 where the exhaust brake is automatically switched to the non-operational state (i.e., the exhaust brake is reset to off or turned off). If it is estimated in step S61 that the vehicle weight is greater than the predetermined threshold, the exhaust brake is maintained in the operational state (i.e., remains on) and the routine returns to step S60. The routine shown in FIG. 7 is continued until the results in step S61 cause the exhaust brake to be switched to the non-operational state.

Another possibility involves automatically turning the exhaust brake 44 to the non-operational state (turning the exhaust brake off or resetting the exhaust brake 44 to off), based on vehicle acceleration/deceleration. Including an appropriate sensor(s) (e.g., the sensor 66 shown in FIG. 3) providing feedback to, for instance, the engine control unit 42 about the acceleration/deceleration of the vehicle, the clutch control unit under the direction or control of the hybrid control unit 39, can automatically switch the exhaust brake to the non-operational state. This helps improve fuel economy by cancelling the exhaust brake 44 when it is not needed for the road or vehicle conditions. For example, vehicle acceleration might be used as an indicator of the weight or load of the vehicle. If the vehicle is able to accelerate rather quickly under a given amount of power, for instance as indicated by input from appropriate sensors on the vehicle, that would indicate the vehicle is relatively lightly loaded or is not carrying a relatively large amount of weight, thus indicating that the exhaust brake 44 can be turned off. Thus, if the vehicle acceleration exceeds a predetermined threshold taking into account the amount of power inputted (e.g., if the acceleration ratio is greater than a predetermined threshold acceleration ratio), the control unit judges that the vehicle is under a light load and can automatically turn off the exhaust brake.

Vehicle deceleration might also be used as an indication of the vehicle condition or road gradient which might warrant turning off the exhaust brake 44. A vehicle decelerating rather quickly (greater than a predetermined threshold deceleration rate), is an indication that exhaust brake might not be needed. This might occur if the vehicle is traveling uphill. Thus, if the vehicle deceleration is more than a predetermined threshold deceleration rate, the control unit can automatically turn off the exhaust brake.

An example of a control routine performed by a control unit (e.g., the hybrid control unit) based on acceleration/deceleration is illustrated in FIG. 8. The control routine starts at step S70 with the exhaust brake in the operational state (i.e., on) and then proceeds to step S71 where it is determined whether or not the accelerator pedal is off (i.e., is not being operated or pressed). If it is determined that the accelerator pedal is off, the routine proceeds to step S74 where it is determined whether the vehicle deceleration is more than (exceeds) a predetermined threshold deceleration or predetermined threshold deceleration rate. If yes, the exhaust brake is turned off or reset to off in step S73 so that the exhaust brake is automatically switched to the non-operational state.

If it is determined in step S71 that the accelerator pedal is in the operational state (i.e., is on), the routine proceeds to step S72 where it is determined if the vehicle acceleration is greater than a predetermined threshold acceleration or predetermined threshold acceleration rate. If yes, the exhaust brake is once again reset to off in step S73 so that the exhaust brake is automatically changed to the non-operational state. If it is determined in step S72 that the vehicle acceleration is not more than the threshold acceleration, the exhaust brake is maintained in the operational state in step S75 and the routine is repeated. Similarly, when it is determined in step S74 that the vehicle deceleration is not more than the predetermined threshold deceleration rate, the exhaust brake is maintained in the operational state in step S75 and the routine is repeated.

Another possibility involves automatically resetting the exhaust brake 44 to off or automatically switching the exhaust brake 44 to the non-operational state based on the gradient of the road. Here, using a gyroscope or other appropriate sensor (schematically shown as 45 in FIG. 3), it is possible to provide signals to the engine control unit 42. If the feedback from the gyroscope or other appropriate sensor indicates a relatively flat or uphill road surface, exhaust brake is not likely necessary. Providing signals from the gyroscope or other appropriate sensor to the engine control unit 42 will allow the engine control unit 42 to automatically turn the exhaust brake 44 to the non-operational state or automatically reset the exhaust brake 44 to off if the signals indicate the road surface on which the vehicle is traveling is a relatively flat or uphill. Improved fuel economy can thus be realized by cancelling the exhaust brake 44 during certain road grade conditions.

An example of a control routine performed by a control unit (e.g., the hybrid control unit) based on the gradient of the road is illustrated in FIG. 9. The routine begins with the exhaust brake in the operational state in step S80 and then proceeds to step S81 where it is determined whether or not the road gradient is estimated to be uphill, flat or less than a downhill threshold gradient. If the answer in step S81 is yes, the routine proceeds to step S82 where the exhaust brake is reset to off or is automatically switched to the non-operational state. If the determination in step S81 is no, the exhaust brake is maintained in the operational state in step S83 and the routine is repeated.

An additional possibility involves automatically resetting the exhaust brake 44 to off or automatically switching the exhaust brake 44 to the non-operational state based on the battery condition. Here, when the charged condition of the battery is relatively low, it is preferable to use the energy regeneration arising during deceleration to charge the battery.

For this reason, it is preferable to automatically switch the exhaust brake to the non-operational state (or possibly reduce the exhaust brake) so that battery charging is prioritized using the energy regeneration during deceleration.

An example of a control routine performed by a control unit (e.g., the hybrid control unit) according to this alternative is illustrated in FIG. 10. The routine begins at step S90 where the exhaust brake is on and proceeds to step S91 where the control unit determines whether the state of charge of the battery is less than a threshold amount or threshold charged state. The state of charge of the battery can be determined by providing an appropriate battery charged state indicator (schematically indicated as 47 in FIG. 3). If the determination in step S91 is yes, the routine proceeds to step S92 where the exhaust brake is automatically set to the non-operational state or is reduced, so that battery charge is prioritized. On the other hand, if it is determined in step S91 that the state of charge of the battery is not less than the threshold, the exhaust brake can be maintained in the operational state in step S93, whereupon the routine is repeated.

In the various alternatives described above by way of example and illustrated in FIGS. 7-10, the engine control unit 42 receives information about the vehicle and/or driving conditions of the vehicle (e.g., information about the vehicle weight, information about accelerator operation or non-operation indicating acceleration or deceleration, information about road gradient, and information about battery charged state). The engine control unit 42 switches the exhaust brake 44 from the operational state to the non-operational state based on the information received by the vehicle. This automatic switching of the exhaust brake to the non-operational state occurs while the vehicle is operating (ignition is on) and without operating the switch 46. That is, the engine control unit 42 switches the exhaust brake to the non-operational state not because the ignition (vehicle) is turned off and not because the exhaust brake switch 46 is operated, but based on the information about the vehicle and/or driving conditions of the vehicle.

As an alternative to automatically resetting the exhaust brake 44 to off or automatically switching the exhaust brake 44 to the non-operational state, it is possible to use the toggle-type switch discussed above, but provide a flashing exhaust brake status light in the vehicle in a readily visible location to the driver that flashes when the exhaust brake is on. This will thus provide an indication to the driver that the exhaust brake is on. When the driver does not want the exhaust brake on, this warning signal will provide a mechanism prompting the driver to turn the exhaust brake off. A similar warning mechanism or arrangement can also be used when the exhaust brake is activated by the momentary switch as described above.

All of the alternatives described above for automatically resetting the exhaust brake 44 to off or automatically turning off the exhaust brake 44 can be used together with the clutch 60 and the clutch control unit 62 described above. The alternatives described above and shown in FIGS. 7-10 can also be used individually, all together, or in any combination of two or more.

The detailed description above describes features and aspects of embodiments of hybrid drive apparatus for a vehicle which are disclosed by way of example. The invention is not limited, however, to the precise embodiments and variations described. Various changes, modifications and equivalents can be employed by one skilled in the art without departing from the spirit and scope of the invention as defined in the appended claims. It is expressly intended that all such changes, modifications and equivalents which fall within the scope of the claims are embraced by the claims.

What is claimed is:

1. A hybrid driving apparatus comprising:
    a transmission that includes a rotatable output shaft connected to wheels of a vehicle;
    a hybrid motor connected to the transmission and operable as both a motor and a generator;
    a diesel engine having an exhaust brake shiftable between an operational state in which the exhaust brake produces a braking effect on the vehicle during deceleration of the vehicle and a non-operational state in which the exhaust brake does not produce the braking effect during deceleration of the vehicle;
    a clutch between the diesel engine and the hybrid motor, the clutch being operable to shift between a connected condition in which the clutch connects the diesel engine to the hybrid motor and a disconnected condition in which the clutch does not connect the diesel engine to the hybrid motor;
    a clutch control unit operatively connected to the clutch to shift the clutch between the connected condition and the disconnected condition;
    an accelerator sensor connected to an accelerator to output accelerator signals indicating whether or not the accelerator is being operated to accelerate the vehicle;
    a momentary switch operatively connected to the exhaust brake so that operation of the momentary switch causes the exhaust brake in the non-operational state to shift to the operational state;
    the clutch control unit shifting the clutch from the connected condition to the disconnected condition during driving of the vehicle when the exhaust brake is in the off state and the accelerator shifts from being operated to not being operated; and
    wherein the clutch control unit shifts the clutch from the disconnected condition to the connected condition during driving of the vehicle when the exhaust brake in the non-operational state is shifted to the operational state and the accelerator shifts from being not being operated to being operated as indicated by the accelerator sensor.

2. The hybrid driving apparatus according to claim 1, wherein the hybrid motor is an electrical motor controlled by an inverter, and a hybrid battery is connected to the inverter, and is charged by the hybrid motor.

3. The hybrid driving apparatus according to claim 1, further comprising an engine control unit connected to the diesel engine to control operation of the diesel engine.

4. The hybrid driving apparatus according to claim 1, further comprising an engine control unit connected to the diesel engine to control operation of the diesel engine, the engine control unit being connected to the accelerator sensor to receive the accelerator signals, and the engine control unit being connected to the clutch control unit to provide the clutch control unit with information about operation of the accelerator to control the clutch.

5. A hybrid driving apparatus comprising:
    a transmission that includes a rotatable output shaft connected to wheels of a vehicle;
    a hybrid motor connected to the transmission and operable as both a motor and a generator;
    a diesel engine;
    a clutch between the diesel engine and the hybrid motor, the clutch being operable to change between: i) an engaged condition in which the clutch connects the diesel engine and the hybrid motor so that power produced by the diesel engine is transmitted to the transmission; and ii) disengaged condition in which the clutch disconnects the diesel engine from the hybrid motor so that the hybrid motor can be regenerated during vehicle deceleration while being free of engine friction of the diesel engine;

the diesel engine including an exhaust brake shiftable between an operational state in which the exhaust brake produces a braking effect on the vehicle during deceleration of the vehicle and a non-operational state in which the exhaust brake does not produce the braking effect on the vehicle during deceleration of the vehicle;

a switch operable to change the exhaust brake from the non-operational state to the operational state, the switch being configured to automatically change the exhaust brake which is in the operational state while the vehicle is turned on to the non-operational state when the vehicle is turned off;

a clutch control unit operatively connected to the clutch to change the clutch between the engaged state and the disengaged state;

the clutch control unit being configured to automatically change the clutch from the engaged condition to the disengaged condition when the vehicle decelerates while the exhaust brake is in the non-operational state and while the diesel engine or hybrid motor is operating; and wherein the clutch control unit shifts the clutch from the disengaged condition to the engaged condition during driving of the vehicle when the exhaust brake in the non-operational state is shifted to the operational state and the vehicle begins to accelerate.

6. The hybrid driving apparatus according to claim 5, wherein the hybrid motor is an electrical motor controlled by an inverter, and a hybrid battery is connected to the inverter, and is charged by the hybrid motor.

7. The hybrid driving apparatus according to claim 5, further comprising an engine control unit connected to the diesel engine to control operation of the diesel engine.

8. The hybrid driving apparatus according to claim 7, further comprising an accelerator sensor providing signals indicating whether the vehicle is accelerating, wherein the engine control unit is connected to the accelerator sensor to receive the signals, and the engine control unit being connected to the clutch control unit to provide the clutch control unit with information about acceleration of the vehicle to control the clutch.

* * * * *